United States Patent
Li et al.

(10) Patent No.: US 7,779,068 B2
(45) Date of Patent: Aug. 17, 2010

(54) SYSTEM AND METHOD FOR INTELLIGENT WEB CONTENT FETCH AND DELIVERY OF ANY WHOLE AND PARTIAL UNDELIVERED OBJECTS IN ASCENDING ORDER OF OBJECT SIZE

(75) Inventors: Wen-Syan Li, Fremont, CA (US); Kunihiro Taniguchi, San Jose, CA (US); Atsuhiro Tanaka, Minato-ku (JP)

(73) Assignee: NEC Corporation, Tokyo (JP)

( * ) Notice: Subject to any disclaimer, the term of this patent is extended or adjusted under 35 U.S.C. 154(b) by 778 days.

(21) Appl. No.: 11/053,279

(22) Filed: Feb. 7, 2005

(65) Prior Publication Data
US 2005/0198309 A1  Sep. 8, 2005

Related U.S. Application Data

(62) Division of application No. 09/545,806, filed on Apr. 8, 2000, now Pat. No. 6,854,018.

(51) Int. Cl.
*G06F 15/16* (2006.01)
*G06F 15/173* (2006.01)

(52) U.S. Cl. ............... 709/203; 709/217; 709/219; 709/226; 709/227

(58) Field of Classification Search ............ 709/203, 709/217, 219, 224, 227, 228, 213; 707/E17.12, 707/E17.109
See application file for complete search history.

(56) References Cited

U.S. PATENT DOCUMENTS

| | | | |
|---|---|---|---|
| 5,572,645 A | 11/1996 | Dan et al. | |
| 5,742,797 A | 4/1998 | Celi et al. | |
| 5,870,546 A | 2/1999 | Kirsch | |
| 5,920,865 A | 7/1999 | Ariga | |
| 5,978,847 A * | 11/1999 | Kisor et al. | 709/227 |
| 6,021,435 A * | 2/2000 | Nielsen | 709/224 |
| 6,067,560 A * | 5/2000 | Potts, Jr. | 709/203 |
| 6,076,109 A * | 6/2000 | Kikinis | 709/228 |
| 6,112,231 A | 8/2000 | DeSimone et al. | |
| 6,134,584 A * | 10/2000 | Chang et al. | 709/219 |
| 6,167,438 A | 12/2000 | Yates et al. | |
| 6,175,838 B1 * | 1/2001 | Papierniak et al. | 709/224 |
| 6,212,565 B1 * | 4/2001 | Gupta | 709/229 |
| 6,249,844 B1 | 6/2001 | Schloss et al. | |
| 6,298,373 B1 * | 10/2001 | Burns et al. | 709/203 |

(Continued)

OTHER PUBLICATIONS

J. Mogul, "The Case for Persistent-Connection HTTP", pp. 1-40, WRL Research Report 95/4, May 1995.

(Continued)

*Primary Examiner*—Quang N. Nguyen
(74) *Attorney, Agent, or Firm*—Foley and Lardner LLP (57) ABSTRACT

A Web content fetch and delivery system is disclosed. The system comprises a proxy server configured for receiving requests for content from requesting end user browsers and fetching the content from content provider servers over at least one communication network. The proxy server is programmed for maintaining a log of all content fetched including a time of the fetch and the requesting end user browser, and storing associations between content fetched within a fixed time period by the same requesting end user browser. When subsequent requests for particular content are received by the proxy server, the proxy server will pre-fetch all content associated with that particular requested content.

2 Claims, 8 Drawing Sheets

U.S. PATENT DOCUMENTS

| | | | |
|---|---|---|---|
| 6,304,864 B1 * | 10/2001 | Liddy et al. | 707/E17.109 |
| 6,308,238 B1 * | 10/2001 | Smith et al. | 709/219 |
| 6,314,492 B1 | 11/2001 | Allen et al. | |
| 6,334,145 B1 * | 12/2001 | Adams et al. | 709/217 |
| 6,351,767 B1 * | 2/2002 | Batchelder et al. | 709/219 |
| 6,374,300 B2 | 4/2002 | Masters | |
| 6,389,463 B2 | 5/2002 | Bolas et al. | |
| 6,393,526 B1 * | 5/2002 | Crow et al. | 709/213 |
| 6,401,171 B1 | 6/2002 | Klein et al. | |
| 6,457,054 B1 * | 9/2002 | Bakshi | 709/227 |
| 6,499,051 B1 | 12/2002 | Kanemitsu | |
| 6,542,967 B1 * | 4/2003 | Major | 707/E17.12 |
| 6,877,036 B1 * | 4/2005 | Smith et al. | 709/227 |
| 2001/0034814 A1 * | 10/2001 | Rosenzweig | 709/203 |

OTHER PUBLICATIONS

R. Fielding, J. Gettys, J. Mogul, H. Frystyk, T. Berners-Lee, "Hypertext Transfer Protocol—HTTP/1.1", 10 pages, Jan. 1997, Internet: http://www.ics.uci.edu/pub/ietf/http/rfc.2068.txt.

* cited by examiner

HTTP 1.0 PROTOCOL

Fig. 7b

PROPOSED PERSISTANT CONNECTION

SYSTEM AND METHOD FOR INTELLIGENT WEB CONTENT FETCH AND DELIVERY OF ANY WHOLE AND PARTIAL UNDELIVERED OBJECTS IN ASCENDING ORDER OF OBJECT SIZE

CROSS-REFERENCE TO RELATED APPLICATIONS

This application is a divisional of U.S. patent application Ser. No. 09/545,806, filed Apr. 8, 2000, by Wen-Syan Li, Kunihiro Taniguchi and Atsuhiro Tanaka, and subsequently issued as U.S. Pat. No. 6,854,018 on Feb. 8, 2005. This application claims only subject matter disclosed in the parent application and therefore presents no new matter.

BACKGROUND OF THE INVENTION

1. Field of the Invention

The present invention relates, generally, to content delivery networks and, in preferred embodiments, to systems and methods for intelligent fetch and delivery of Web content to improve content delivery services.

2. Description of the Related Art

Web performance is a key point of differentiation among content providers. Crashes and slowdowns within major Web sites demonstrate the difficulties companies face in trying to deal with high Web traffic. As Internet backbone technologies have developed, many innovations in the area of service management have improved bandwidth and Web content retrieval response time. These improvements to infrastructure, however, cannot solve traffic problems at all points within the Internet.

Figure 1:
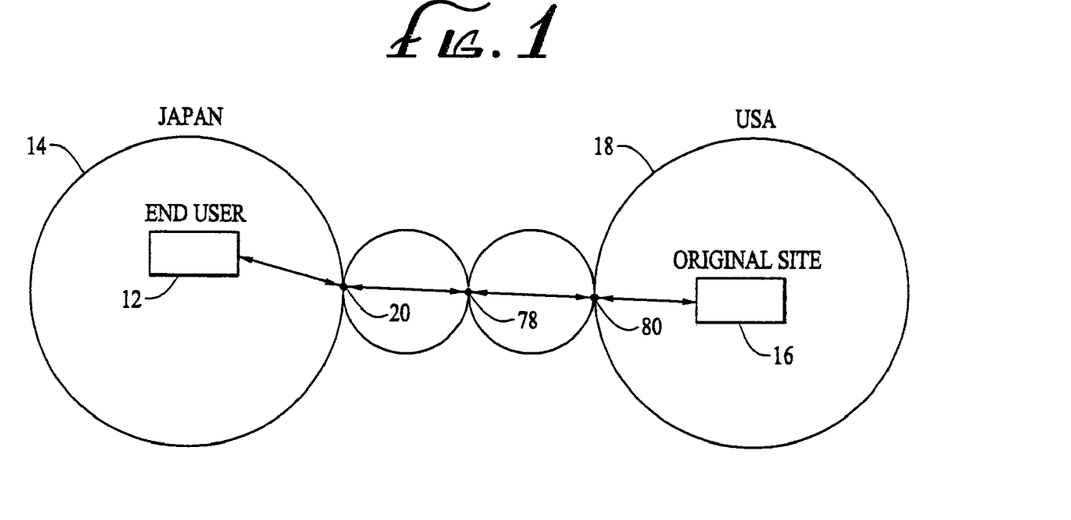
FIG. 1 is a block diagram illustrating an example of a conventional content delivery path between an end user and a Web site.

For example, assume in FIG. 1 that an end user 12 in a network 14 in Japan requests access to a page from a Web site 16 in a network 18 the United States. The request must pass through several gateways 20, 78, and 80 before reaching Web site 16. Although Web site 16 may have large bandwidth (the ability to rapidly communicate large quantities of data), the gateways connecting the network 14 in Japan to the network 18 in the United States may be slow, and thus, when end user 12 attempts to access the page from Web site 16, the gateways may create a bottleneck. Such gateway bottlenecks may result in the access time for one page of data being on the order of 10 seconds or more. Because of the gateway bottlenecks, and because there are many uncertainties along the Internet paths from end user 12 to/from the Web site 16, content delivery networks or systems are now being developed.

Fundamentally, content delivery systems may be designed and deployed for at least two major purposes; one is to achieve load balancing, and the other is to reduce response time. A content delivery system may be implemented using a high speed dedicated line to deliver content while bypassing all gateways or reducing the number of Internet gateways in the transmission path. However, such a dedicated network is expensive and cannot be deployed for all networks. Another approach to implementing content delivery systems is through the use of intelligent caching, mirroring, proxy servers, or other techniques which redirect end users to available servers that contain the desired content and are close to or easily accessible by the end users to ensure fast response time. With some of the traffic redirected, traffic surges will decrease and end users benefit from faster response time. The term generally used for the architecture and functionality of such networks or systems is content delivery services (CDS).

Figure 2:
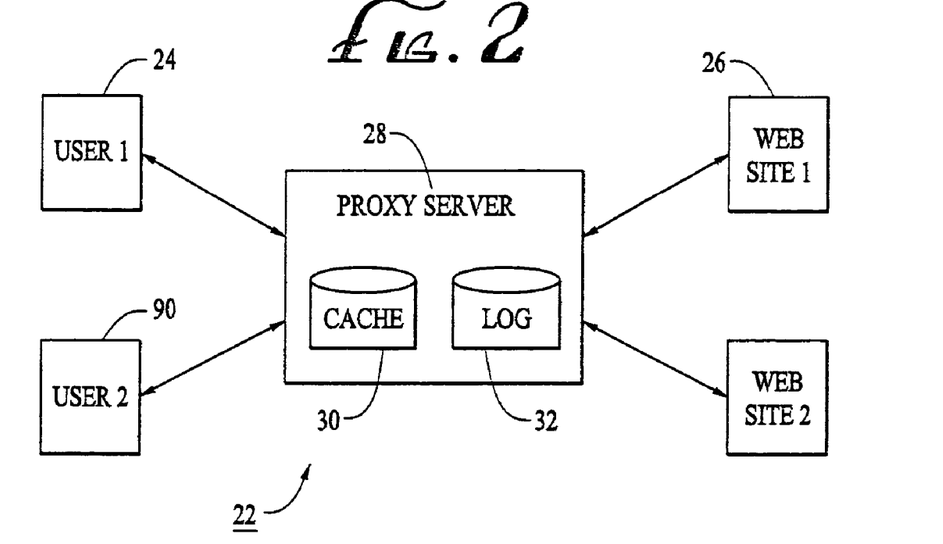
FIG. 2 is a block diagram illustrating an overview of a typical Web content delivery and caching scheme.

FIG. 2 illustrates an overview of a conventional Web content delivery and caching scheme 22. It should be understood that FIG. 2 is related to FIG. 1 in that the proxy server 28 of FIG. 2 is located at some point between the end user 12 and original Web site 16 of FIG. 1. When a user (e.g. user 1; see reference character 24) attempts to access a page (e.g. index.html) from a Web site (e.g. Web site 1; see reference character 26), the browser of user 1 will first send a request to a domain name server (DNS) to find the Internet Protocol (IP) address corresponding to the domain name of Web site 1. Although not shown in FIG. 2, it should be well understood by those skilled in the art that a network of DNSs exists to locate the IP addresses of requested domain names.

After the browser of user 1 receives the IP address of Web site 1, the browser will attempt to access the page from proxy server 28. Proxy server 28 will then determine if the desired page is in the cache 30 of proxy server 28. If the desired page is in cache 30, proxy server 28 will simply deliver the content in cache 30 to user 1 without attempting to access the page from the original Web site (Web site 1). If the desired page is not in cache 30, proxy server 28 will send a request to Web site 1 to fetch index.html (text only).

After the browser of user 1 receives index.html, the browser will parse the page and issue additional requests to fetch embedded objects such as images and icons. However, proxy server 28 will first receive these requests and determine if the embedded objects are available in cache 30. If the desired objects are in cache 30, proxy server 28 will simply deliver the objects in cache 30 to user 1 without attempting to fetch the objects from the original Web site (Web site 1). If the desired objects are not in cache 30, proxy server 28 will send requests to the appropriate Web sites to fetch the objects.

Traffic (i.e. data flow) can be recorded in a log file 32 in proxy server 28. Such a log file may contain the IP addresses of the originators of requests, the URLs of objects fetched, a time stamp for each action, and the like. It should be noted that a proxy server 28 is usually shared by many users so that the contents of cache 30 can be accessed by users with similar interests. Thus, for example, if user 1 accesses a page and that page is stored in cache 30, when user 2 (see reference character 90) requests the same page, proxy server 28 can simply provide the page stored in cache 30 to user 2.

However, delays may still occur during the fetching of embedded objects because of the high processing overhead associated with each fetch. For example, a typical Web page may consist of images and icons, which are essentially small images. The data associated with an icon may be transferred using just a few data packets. However, in any transfer there is processing overhead in the form of commands to open and close the connection. This processing overhead may comprise six or seven data packets.

Figure 3:
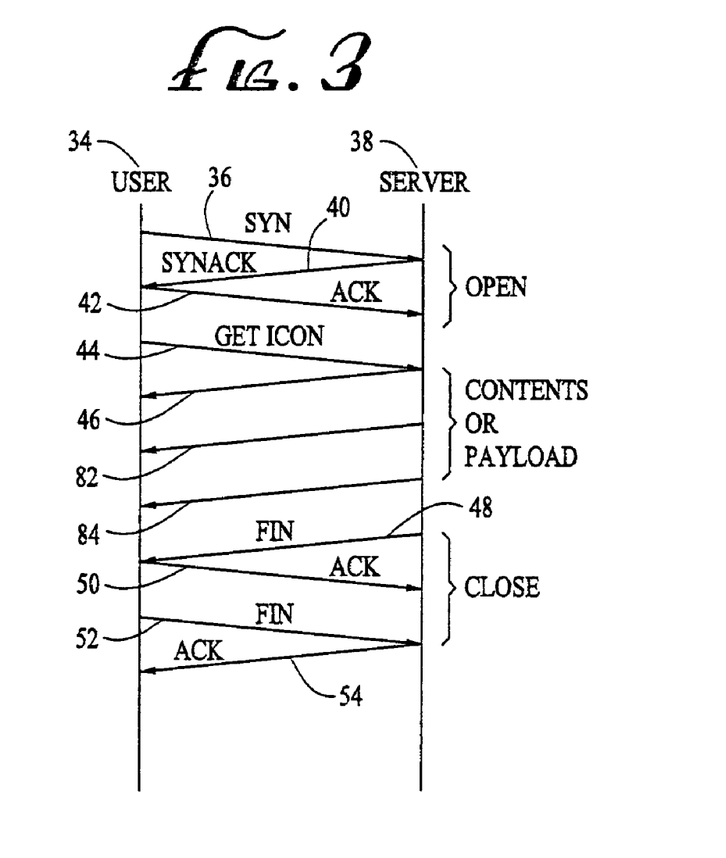
FIG. 3 is a representative diagram illustrating the data packets involved in the transfer of an icon.

FIG. 3 illustrates the data packets involved in the transfer of an icon. First, a user 34 sends a SYN request 36 to a server 38 using a data packet to establish a connection. In response, server 38 will send a SYN acknowledgment message 40 back to user 34 using another packet. User 34 will then acknowledge receipt of that packet by sending an acknowledgment 42 back to server 38 using yet another packet. Three packets are therefore required to open a connection. Once the connection is open, user 34 may send a "get-icon" request 44 to server 38 using another packet. Server 38 will then send multiple packets 46, 82, and 84 back to user 34 containing the payload or contents of the icon. Once the data transfer is complete, server 38 sends a FIN message 48 back to user 34 using another packet. FIN message 48 indicates that server 38 wants to terminate the connection. In response, user 34 sends an acknowledgment message 50 back to server 38 using one packet. User 34 then sends a FIN message 52 back to server 38 using one packet, and server 38 acknowledges receipt of this packet by an acknowledgment message 54 back to user 34. Thus, a total of four packets are needed to close the connection. The example of FIG. 3 illustrates that icon transfer can be very inefficient, for seven packets of overhead are needed for just two or three packets of content. This inefficiency is compounded because on a typical Web page there are many icons.

In addition, because a Web page may require the fetching of multiple images, and because servers may impose a fixed limit of connections per user, not all images may be simultaneously fetched. An unscheduled fetching of multiple images may result in a user viewing incomplete images for long periods of time. However, it may be important for a user to see some full images within a reasonable time in order to click on that image to further navigate the Internet. From the user's point of view, it may be desirable to see complete embedded objects as early as possible so that the user can have a better idea about the content of the web page. This is especially applicable to small images such as icons, for a user may not be able to understand the content of a Web page based on a portion of an already small image.

SUMMARY OF THE DISCLOSURE

Therefore, it is an advantage of embodiments of the present invention to provide a system and method for intelligent Web content fetching and delivery that keeps the connection between user and content provider server open for multiple object transfers, thereby reducing the number of times that a connection is opened and closed, reducing content transfer overhead, and improving access time.

It is a further advantage of embodiments of the present invention to provide a system and method for intelligent Web content fetching and delivery where, when multiple objects are being delivered, any remaining full or partial objects are transmitted in ascending order of object size.

It is a further advantage of embodiments of the present invention to provide a system and method for intelligent Web content fetching and delivery that improves the response time of Web content fetches by pre-determining the addresses of domain names, pre-establishing connections in anticipation of their need, and by keeping a connection open in anticipation of future object transfers.

It is a further advantage of embodiments of the present invention to provide a system and method for intelligent Web content fetching and delivery in which the proxy server maintains a log of page and object fetches, determines and stores likely associations between page and object fetches occurring within a specified time window, and pre-fetches objects into cache according to the stored associations when subsequent page requests are received.

These and other advantages are accomplished according to a Web content fetch and delivery system comprising a proxy server configured for receiving requests for content from requesting end user browsers and fetching the content from content provider servers over at least one communication network. The proxy server is programmed for maintaining a log of all content fetched including a time of the fetch and the requesting end user browser, and storing associations between content fetched within a fixed time period by the same requesting end user browser. When subsequent requests for particular content are received by the proxy server, the proxy server will pre-fetch all content associated with that particular requested content.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Web performance is a key point of differentiation among content providers. Crashes and slowdowns within major Web sites demonstrate the difficulties companies face in trying to deal with high Web traffic. As Internet backbone technologies have developed, many innovations in the area of service management have improved bandwidth and Web content retrieval response time. These improvements to infrastructure, however, cannot solve traffic problems at all points within the Internet. Gateway bottlenecks may result in the access time for one page of data being on the order of 10 seconds or more. Because of the gateway bottlenecks, and because there are many uncertainties along the Internet paths from end user to Web sites, content delivery networks or systems are now being developed.

Fundamentally, content delivery systems are designed for two major purposes; one is to achieve load balancing, and the other is to reduce response and access time. Embodiments of the present invention described herein reduce response and access time through content delivery systems that use intelligent caching and proxy servers to redirect users to available servers that contain the desired content and are close to or easily accessible by the users. With some of the traffic redirected, traffic surges will decrease and end users benefit from faster response time.

As described above, the object fetch sequence is an html page fetch followed by many embedded object fetches. Since one html page usually has a few embedded objects of various sizes, delivery of such objects can have an impact on the users' experience using the Web. In the following paragraphs a Web object delivery scheduling scheme which provides users with a better display sequence is described according to embodiments of the present invention.

In any Web object delivery scheme, several steps must be performed. First, a domain name server (DNS) network must be used to perform a domain name search. The result of this domain name search is the address of the content provider site containing the data to be fetched. Second, a connection must be established by opening a socket or channel. Once this connection is established, the objects can be fetched.

FIG. 4 generally illustrates the fetching of three embedded objects within an html page using one socket or channel, wherein the size of object 1 (obj1) is larger than the size of object 2 (obj2), and the size of obj2 is larger than the size of object 3 (obj3). In FIG. 4, the horizontal axis represents time, while the vertical axis represents network bandwidth.

Figure 4A:
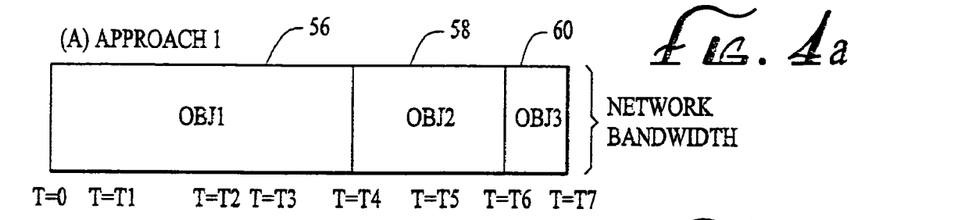
FIG. 4(a) illustrates one approach to Web content delivery scheduling in which a server delivers the objects in an arbitrary sequence.
Figure 4B:
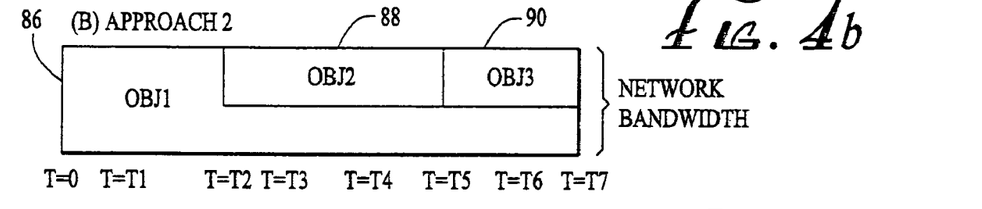
FIG. 4(b) illustrates another approach to Web content delivery scheduling in which the server may deliver two objects in the same network at the same time.

FIG. 4(a) illustrates one approach to Web content delivery scheduling in which a server delivers the objects using one socket or channel in an arbitrary sequence. In the arbitrary delivery sequence shown in FIG. 4(a), obj1 (see reference character 56) is delivered first, followed by obj2 (see reference character 58) and obj3 (see reference character 60). A user will not be able to completely view any embedded object until t=t4, when obj1 can be completely viewed. FIG. 4(b) shows another approach to Web content delivery scheduling in which the server may deliver two objects in the same network at the same time using two sockets, such as at time t=t2, when both obj1 (see reference character 86) and obj2 (see reference character 88) are being simultaneously transmitted, each using a portion of the network bandwidth. As FIG. 4(b) illustrates, the user will not be able to see any complete embedded object until t=t5, when obj2 can be completely viewed.

It should be understood that it is difficult for a server to determine whether an embedded object of a target size is more important than an embedded object of another size, due to the subjectivity of the evaluation. Object size may not be the only factor to determine importance. For example, an object of a larger size could be an advertisement banner while a smaller embedded object could be an icon for a selection button that is essential to operation. From the user's point of view, it may be desirable to see complete embedded objects as early as possible so that the user can have a better idea about the content of the Web page. This is especially applicable to small images, for a user may not be able to understand the content of a Web page based on a portion of an already small image. Conversely, a user may be able to understand the content of a Web page based on a portion of a larger image.

Figure 4C:
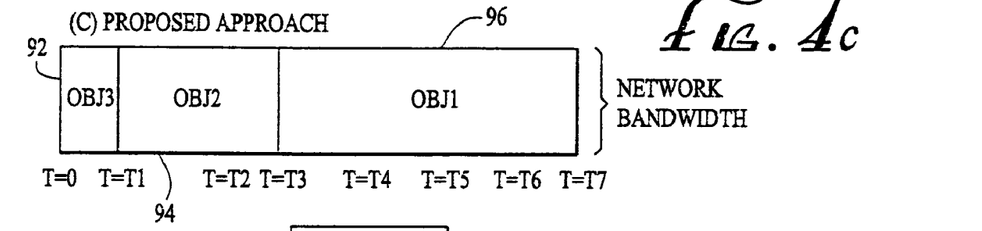
FIG. 4(c) illustrates an embedded object delivery strategy which delivers embedded objects in an ascending order of object size according to an embodiment of the present invention.

FIG. 4(c) illustrates an embodiment of the present invention employing an embedded object delivery strategy which delivers embedded objects in an ascending order of object size. It should be understood that servers may store management information on stored objects, including object size (contained in the metadata of the object), and that users can receive this information before the actual delivery of objects by http protocol. Because the smallest objects are delivered first, a user is able to view a complete image at t=t1, much earlier than the approaches of FIGS. 4(a) and 4(b). Embodiments of the present invention illustrated in FIG. 4(c) therefore allow users view complete embedded objects earlier than other approaches.

Figure 5A:
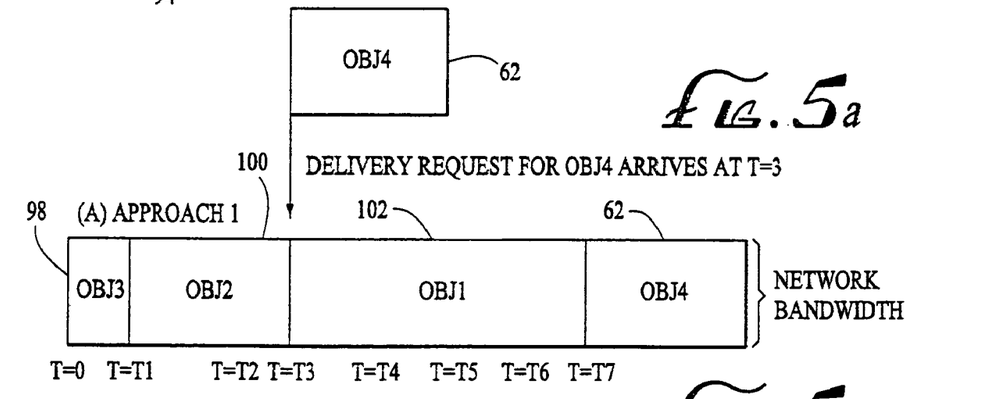
FIG. 5(a) illustrates one approach to Web content delivery scheduling wherein, if a new embedded object request for an object arrives at the time when another object is scheduled to be delivered, the previously scheduled object will be delivered first.

FIG. 5 generally illustrates an alternative embodiment of the present invention. In the example of FIG. 5(a), after smallest obj3 (see reference character 98) and next smallest obj2 (see reference character 100) have been delivered, respectively, and larger obj1 (see reference character 102) is about to be delivered, an embedded object request for obj4 (see reference character 62) arrives at t=t3, where obj4 is smaller than obj1. One method illustrated in FIG. 5(a) would schedule the delivery of new requests after the delivery of all existing requests had been completed. Thus, in the example of FIG. 5(a), the delivery of obj4 would occur after the delivery of obj1. However, this schedule will increase the average waiting time for complete embedded objects, considering all users.

Figure 5B:
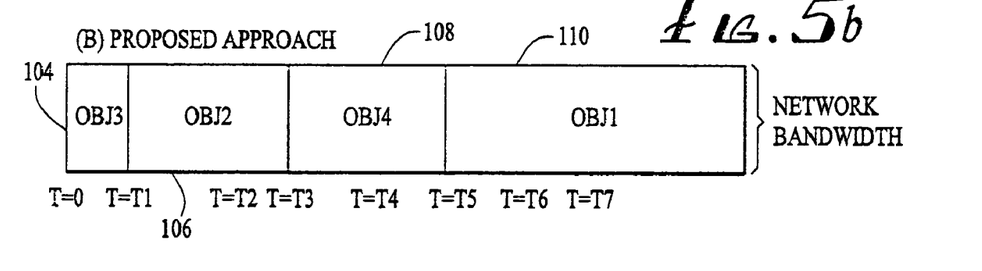
FIG. 5(b) illustrates another approach to Web content delivery scheduling wherein, if a new embedded object request for an object arrives at the time when another object is scheduled to be delivered, the smaller object will be delivered first according to an embodiment of the present invention.

In an embodiment of the present invention illustrated in FIG. 5(b), an embedded object delivery strategy is employed which delivers any remaining embedded objects in ascending order of object size, regardless of when the request for the embedded object occurred. Thus, in the example of FIG. 5(b), because obj4 (see reference character 108) is smaller than obj1 (see reference character 110), the delivery of obj4 will be dynamically scheduled to occur before the delivery of obj1 so that the average waiting time for embedded objects considering all users is minimized.

Figure 6A:
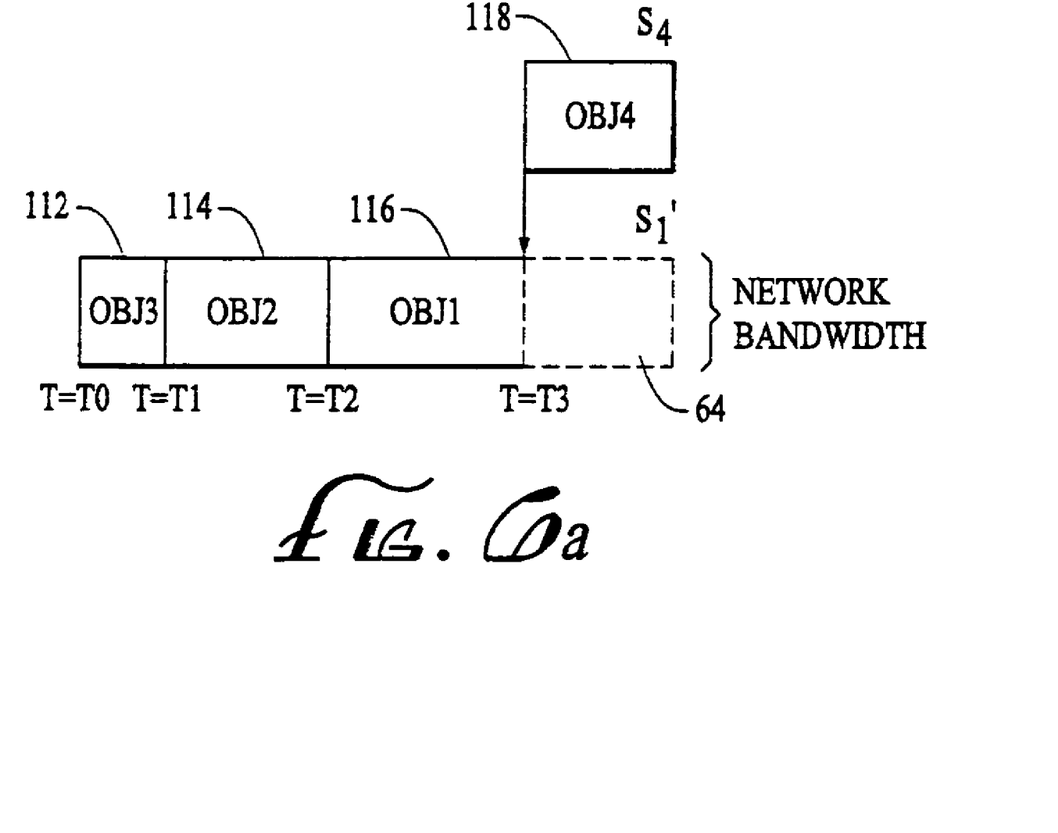
FIG. 6(a) illustrates one situation that may occur in Web content delivery scheduling wherein a new embedded object request for an object arrives at the time when another object is in the process of being delivered.
Figure 6B:
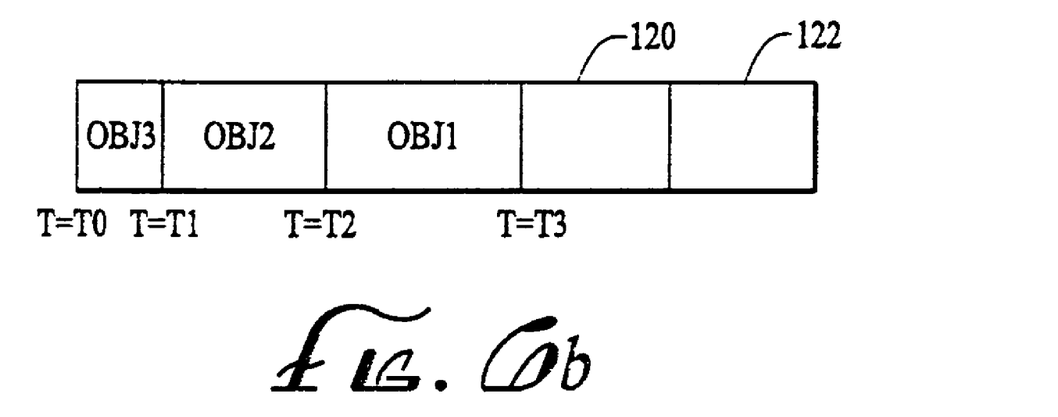
FIG. 6(b) illustrates another approach to Web content delivery scheduling wherein, if a new embedded object request for an object arrives at the time when another object is in the process of being delivered, the smaller of the new embedded object and the untransmitted remainder of object being delivered will be delivered first according to an embodiment of the present invention.

FIG. 6 generally illustrates a further alternative embodiment of the present invention. In FIG. 6(a), after smallest obj3 (see reference character 112) and next smallest obj2 (see reference character 114) have been delivered, respectively, and larger obj1 (see reference character 116) is in the process of being delivered, an embedded object request for obj4 (see reference character 118) arrives at t=t3, where obj4 is smaller than obj1. At t=t3, the remainder of obj1 that has yet to be transmitted is indicated by reference character 64. The size of remainder 64 shall be referred to herein as $S_1'$, while the total size of obj4 shall be referred to herein as $S_4$. In an embodiment of the present invention illustrated in FIG. 6(b), the smaller of the two images $S_1'$ and $S_4$ is delivered first (see reference character 120), followed by the larger of the images (see reference character 122). In the example of FIG. 6(a), if the total size of obj4 ($S_4$) is smaller than the remaining size of obj1 ($S_1'$), then obj4 will be delivered while the delivery of the remainder of obj1 will be temporarily suspended. However, if the total size of obj4 ($S_4$) is greater than the remaining size of obj1 ($S_1'$), delivery of obj1 will be completed before the start of delivery of obj4.

Thus, in preferred embodiments of the present invention, if the size of the newly requested object is smaller than the size of the remaining object being transmitted, the transmission of the remaining object is suspended, and the newly requested object is scheduled for immediate transmission.

However, if there are many requests to transmit small embedded objects, the problem of starvation may occur wherein larger objects never get delivered. To prevent this from happening, in alternative embodiments of the present invention a priority value may be assigned to each suspended object, computed as the waiting time of an object to be delivered divided by the size of the object. Thus, as a request remains suspended and waiting to be delivered by the system, its priority value increases. The larger the priority value of an object, the earlier the object is delivered. Eventually, therefore, any suspended large object will reach a priority value sufficient for delivery.

It should be noted that although the embodiments of the present invention illustrated in FIGS. 4-6 are generically described in terms of Web content delivery by a server, the embodiments of FIGS. 4-6 are also applicable to the transferring of objects from content provider servers to end users and from proxy servers to end users. From a server perspective, the examples of FIGS. 4-6 illustrate the delivery of obj1, obj1, obj3, and obj4 from a server to a client or user. Thus, in FIG. 6(a), when a request for obj4 is received in the middle of the transfer of obj1, the request for obj4 may be coming from another client or user.

In addition, the concepts of FIGS. 4-6 can be applied to the receipt of objects by a client or user from a content provider server or a proxy server. Objects are initially requested by the user's Web browser through a communication program in the user's computer.

The Web browser, communication program, and user computer are referred to herein as a user.

When objects are delivered to a user, the communication program loads the objects into memory. Only then is the size of the objects known by the communication program. Once objects have been stored into memory, the communication program may schedule the delivery of multiple objects to the Web browser according to embodiments of the present invention illustrated in FIGS. 4-6.

Figure 7A:
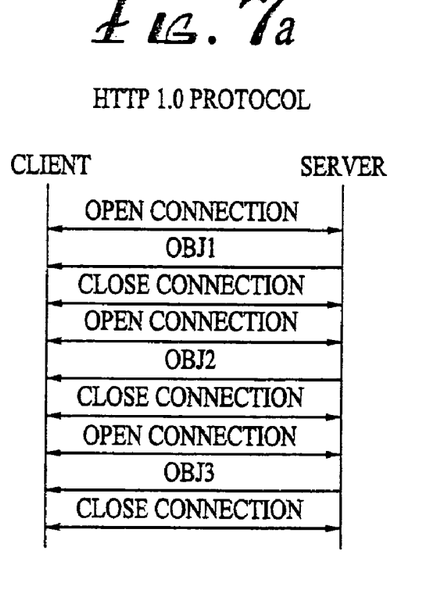
FIG. 7(a) is a representative diagram illustrating an overview of a conventional object fetch procedure based on HTTP 1.0 protocol.

FIG. 7 illustrates a persistent connection methodology according to another embodiment of the present invention. The persistent connection methodology generally results in better response time as compared with the use of conventional HTTP 1.0 protocols. FIG. 7(a) illustrates an overview of a conventional object fetch procedure based on HTTP 1.0 protocol. Note that a connection is opened and closed for each object transfer. The example procedure of FIG. 7(a) requires nine steps to send three objects from the server to the client, each step representing one or more data packets.

Figure 7B:
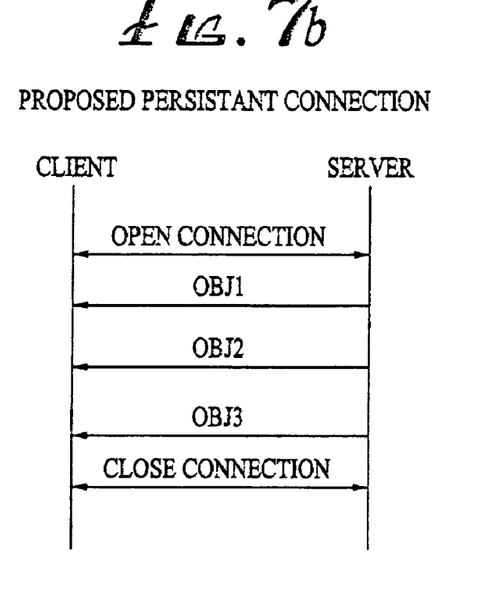
FIG. 7(b) is a representative diagram illustrating the persistent connection methodology according to embodiments of the present invention.

By comparison, the persistent connection methodology of embodiments of the present invention is illustrated in FIG. 7(b). The persistent connection methodology improves response time by eliminating overhead steps. Overhead is eliminated by keeping the connection open for multiple object transfers, thereby reducing the number of times a connection is opened and closed. Transferring multiple objects within the same connection also results in savings in CPU processing and memory consumption. It should be noted that when a server goes down, it is usually not because the server is unable to send required information. Rather, it is usually because the server does not have sufficient CPU and memory available because of the amount needed to open and close connections. Thus, it is generally more efficient to keep extra connections open, rather than keeping fewer connections open but constantly opening and closing them.

In conventional networks, a "get-target-object" request in the format of "GET target-object http/1.0" is communicated for each transfer of icon information, where the "1.0" indicates the version of http. Such a request fetches the image for one icon. Other icons can subsequently be fetched by sending another "get-target-object" request. However, in embodiments of the present invention, multiple object transfers can be accomplished in a single connection by extending the "get-icon" command to multiple icons. The request may be in the format of "GET list-of-targets http/1.0 extended," where the "list-of-targets" specifies a list of objects to be delivered within the same connection. Thus, if "list-of-targets" is comprised of obj1, obj2, obj3, and obj4, then this request will deliver obj1, obj2, obj3, and obj4, etc. within one connection. It should be noted that the delivery of multiple images within the same connection is possible only if the images are being delivered from the same server.

When transferring multiple images within a single open connection, the user must know when one image has completed its transfer and a new image is being transferred. As described with reference to FIGS. 4-6 above, the size of all images to be transferred is known in advance by the server that is currently storing the images. Users can receive this information before the actual delivery of objects by http protocol. In embodiments of the present invention, these sizes are used to determine when one image is complete and the transfer of the next image has begun.

It should be noted that when multiple images are transferred in the same connection, as illustrated in FIG. 7(b), the embodiments of the present invention for determining the order of image transfer described with reference to FIGS. 4-6 may be employed. For example, in FIG. 7(b), obj1, obj2, and obj3 may actually be transmitted in ascending order of object size.

Figure 8:
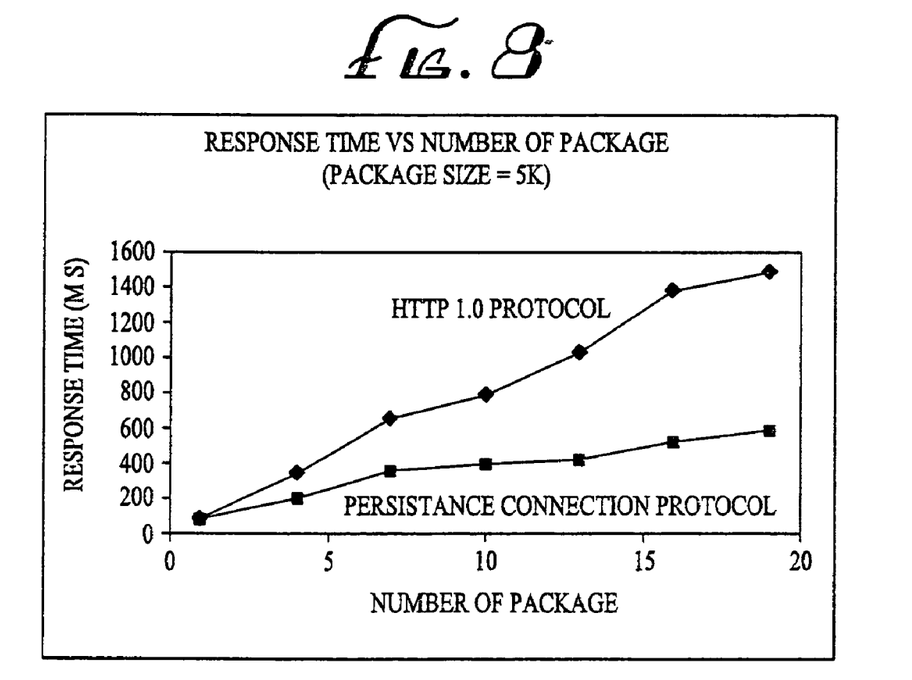
FIG. 8 is a graph illustrating an experimental result involving the transfer of objects between two Web sites using a conventional protocol and a modified multiple object transfer protocol according to embodiments of the present invention.

FIG. 8 illustrates an experimental result involving the fetching of objects between two Web sites using a conventional http 1.0 protocol and a protocol according to embodiments of the present invention. This experimental result illustrates that the persistent connection methodology of the present invention yields faster response time that conventional object transfer protocols.

It should be noted that although embodiments of the present invention illustrated in FIGS. 7(a), 7(b), and 8 were described generally with respect to users and servers, embodiments of the present invention also apply to users requesting content directly from content provider servers, users requesting content from proxy servers, proxy servers requesting content from content provider servers, and mirror servers requesting content from content provider servers.

Users, proxy servers, and mirror servers that request content from other servers shall be referred to herein as requestors.

FIG. 9 illustrates domain name pre-lookup and the pre-establishing of connections for improving the response time of Web content fetches according to alternative embodiments of the present invention. These embodiments will be explained using an example.

Figure 9A:
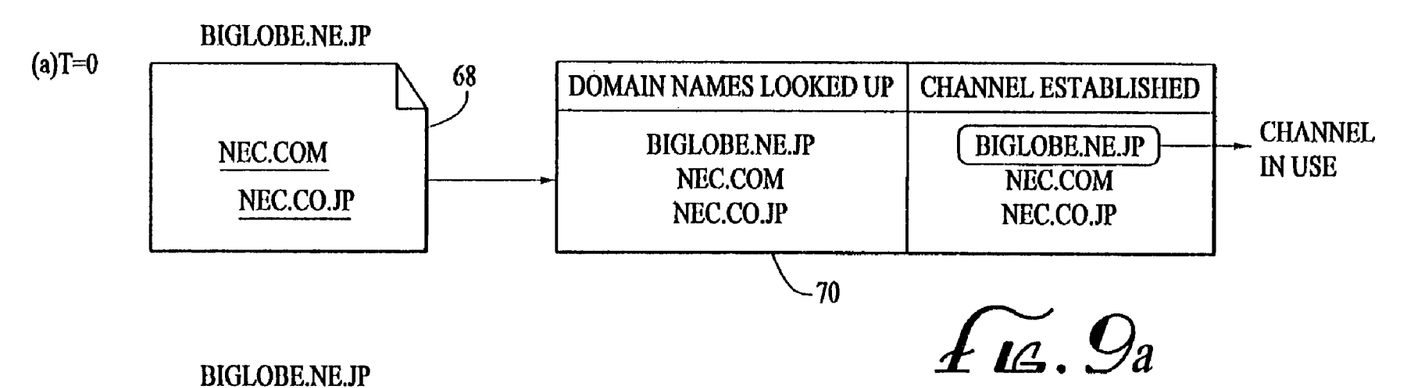
FIG. 9(a) is a block diagram illustrating pre-domain name lookup and pre-establishing of connections according to embodiments of the present invention.

In the example of FIG. 9(a), when a user accesses the page biglobe.ne.jp 68 from a proxy server (not shown), and if this page is not already in the proxy server, a channel connecting the proxy server to the Web site biglobe.ne.jp will be opened, and an index.html (text only) page will be fetched into the proxy server. This page will then be delivered to the user. The proxy server will also look up the linked URLs in the page, such as nec.com and nec.co.jp, as shown in the table identified by reference character 70. These IP addresses are looked up even though no access request for these pages has been received. However, if these pages are in fact requested, because the addresses for the domain names have already been determined, response time may be reduced. The penalty for domain name pre-lookup is minimal, for such activity consumes relatively little bandwidth.

In alternative embodiments of the present invention, further steps may be taken to improve the response time of Web content fetches. In the example of FIG. 9(a), the channel connecting the proxy server to the Web site biglobe.ne.jp may be kept open (see table 70) even though all objects have been delivered. By keeping the connection open, subsequent content fetches or page refreshes requiring a connection between the proxy server and biglobe.ne.jp can be communicated without having to open a new connection. In one embodiment, the connection may be kept open for a fixed number of link traversals, regardless of the links that appear on any of the pages traversed. In alternative embodiments, the connection may be kept open only as long as links on the opened page indicate that further fetches from the content provider server may be requested. Thus, if the Web page for biglobe.ne.jp included links to other related biglobe Web pages, the connection between the user and biglobe.ne.jp would remain open.

In addition, channels connecting the user to nec.com and nec.co.jp may be pre-established, even though these Web sites have not been requested. Thus, in the example of FIG. 9(a), after the IP addresses for domain names nec.com and nec.co.jp are determined, a channel for these servers is established (see table 70). If the content at nec.com and nec.co.jp is requested, the fetch can occur immediately, without having to open a new connection first. Note that in preferred embodiments, the contents at nec.com and nec.co.jp are not pre-fetched because such pre-fetching is expensive in term of bandwidth. However, pre-establishing connections will consume very little network bandwidth while improving response time substantially.

Figure 9B:
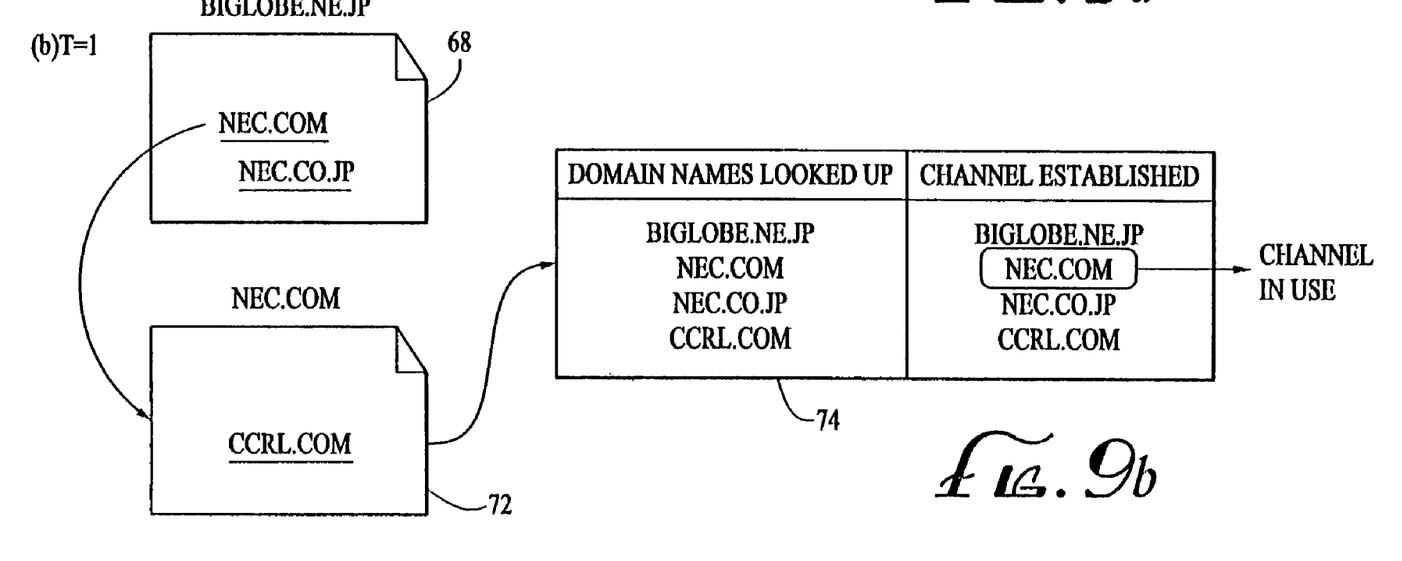
FIG. 9(b) is a block diagram illustrating further pre-domain name lookups and pre-establishing of connections according to embodiments of the present invention.

In preferred embodiments of the present invention, the process of pre-domain name lookup and pre-establishing connections continues as page links are traversed. Thus, as illustrated in the example of FIG. 9(b), when the user navigates from the page biglobe.ne.jp 68 to the page nec.com 72, which contains a link to the page ccrl.com, the address for domain name ccrl.com is determined and a channel is established for anticipated fetching from ccrl.com. (See table identified by reference character 74.) This process of performing domain name pre-lookup and pre-establishing channels may continue for multiple page link traversals, as illustrated by FIG. 9(c) and the table identified by reference character 76.

However, from a proxy server perspective, opening too many channels may consume an excessive number of resources. Thus, in embodiments of the present invention, previously used channels are closed according to predetermined criteria. For example, in one embodiment, channels for links to pages which can be only accessed more than a fixed number of link traversals away may be closed. Thus, in the example of FIG. 9(c), when the user navigates to ccrl.com, the channel connecting biglobe.ne.jp is closed, as indicated by the missing entry in table 76. Alternatively, a fixed number of channels may be kept open, and as this fixed number is reached, the earliest channel opened may be closed.

Figure 9C:
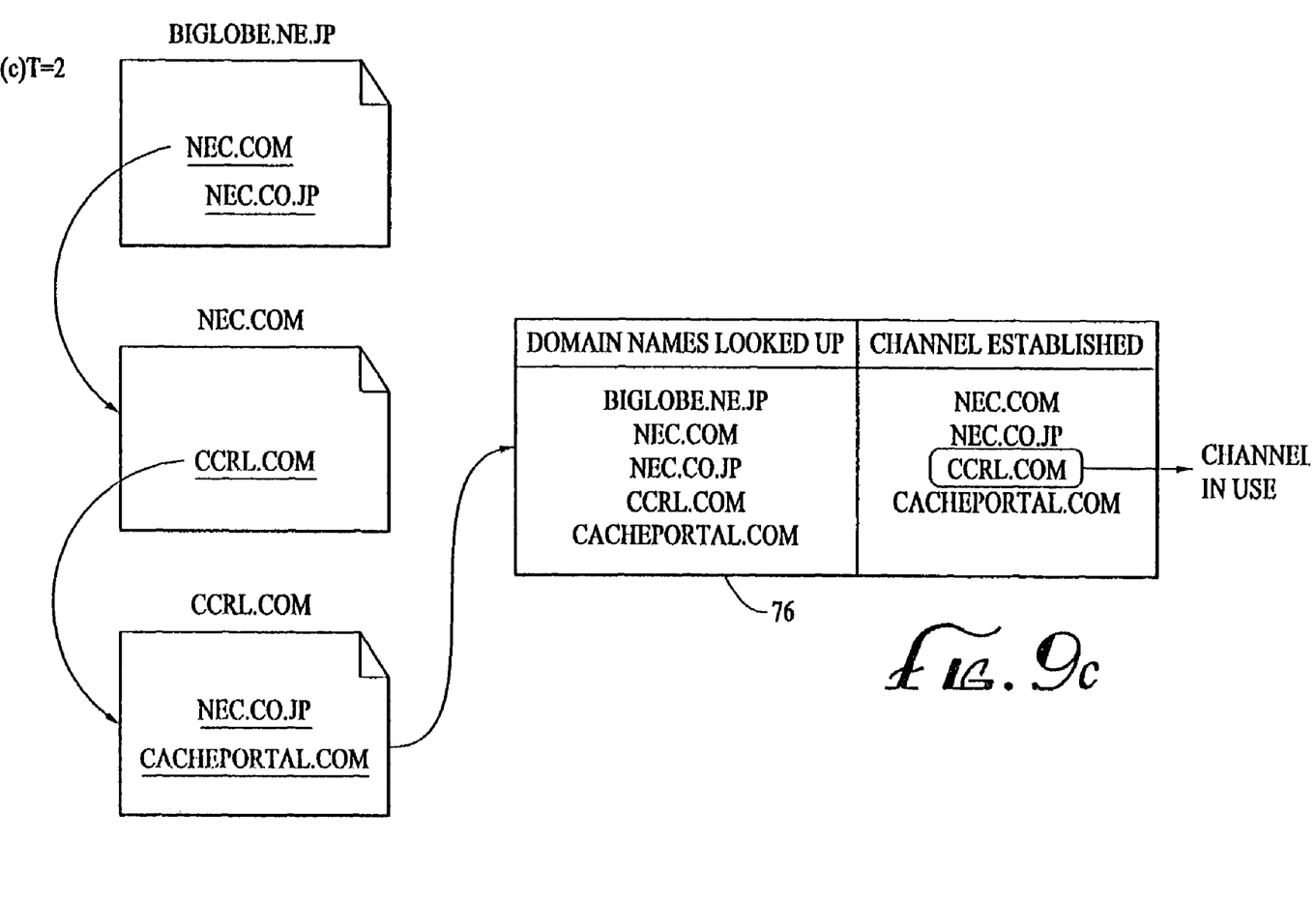
FIG. 9(c) is a block diagram illustrating further pre-domain name lookups and pre-establishing of connections, and the closing of old connections, according to embodiments of the present invention.

It should be noted that although embodiments of the present invention illustrated in FIGS. 9(a) through 9(c) were described with respect to proxy servers, embodiments of the present invention also apply to users requesting content directly from content provider servers. Thus, if a user fetches an index.html page from a content provider server, the user may keep the connection open, look up the linked URLs in the page, pre-establish connections, or close connections as described in the previous paragraphs.

A further embodiment of the present invention related to parallel pre-fetching based on log entries will be discussed next. As described above, when a user fetches a page, the HTML textual page is fetched first, followed by a sequence of embedded object fetches. This sequence is recorded in a log. Since these fetches generally occur within a relatively short time (e.g. a few seconds to a few minutes if the network condition is not good), in embodiments of the present invention the log information will be analyzed to associate entries which are possibly related to the same HTML page fetch.

Figure 10:
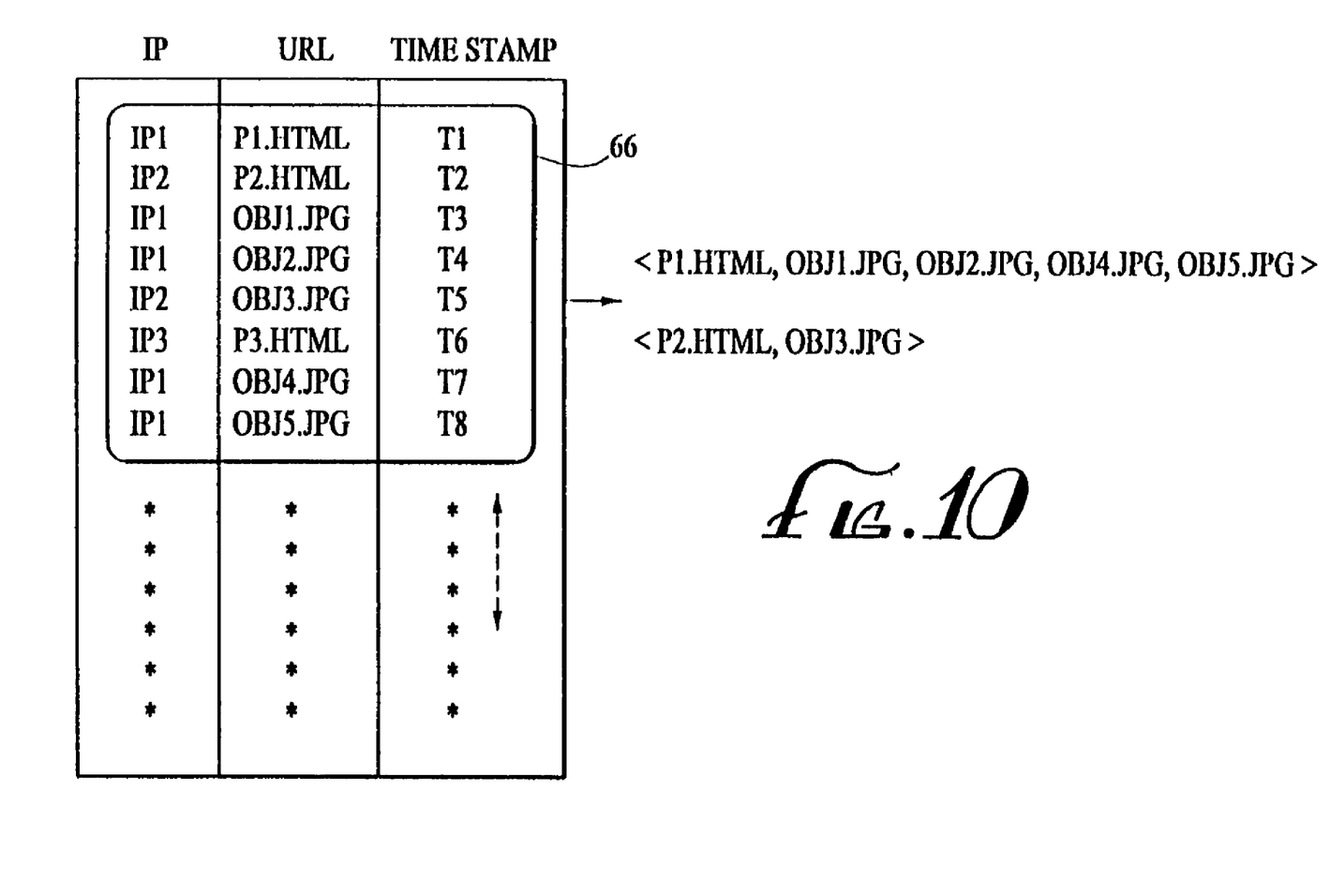
FIG. 10 illustrates a series of log entries that includes a partial fetch history for three different users which is used to perform parallel log-based pre-fetching according to embodiments of the present invention.

FIG. 10 illustrates an example series of proxy server log entries that includes a partial fetch history for three different users, identified by their addresses as IP1, IP2, and IP3. Each log entry includes the IP address from where the request originated, the URL for the requested page or object, and the time of the request. These log entries may be kept in cache for a fixed period of time, e.g. 24 hours. In preferred embodiments of the present invention, a time window 66 is selected to examine the association among the entries in the log. If time window 66 is small, it will likely have fewer entries and the associations will likely be easier to compute. However, small time windows 66 may not allow sufficient time for images to be downloaded, and thus some associations may be missed. In one embodiment of the present invention, time window 66 is set to a fixed time such as 30 seconds. In an alternative embodiment where the pre-fetching is performed by a Web browser, the Web browser's "time-out" period (the length of time the Web browser will wait while trying to establish a connection) may be used as the window size.

In the example of FIG. 10, within window 66 the log entries indicate that user IP1 fetched a page P1.html, followed by a fetch of objects obj1.jpg, obj2.jpg, obj4.jpg, and obj5.jpg by user IP1. It should be noted that because the log entries include the fetch history for multiple users, these fetches may be interleaved with fetches from other users. Because the object fetches closely followed the page fetch in time, it is likely that objects obj1.jpg, obj2.jpg, obj4.jpg, and obj5.jpg were embedded in the page P1.html, and were fetched as a consequence of the page parse by the browser. It is unlikely that these three requests were made independently by a user entering separate requests within a short period of time. Because object fetches that closely follow a page fetch by the same user are likely co-located, in preferred embodiments the proxy server creates an association between the page and object fetches. In the example of FIG. 9, the proxy server will determine that obj1.jpg, obj2.jpg, obj4.jpg, and obj5.jpg are most likely the embedded objects in page P1.html, and will therefore store these associations. Similarly, the proxy server in the example of FIG. 9 will determine that obj3.jpg is most likely embedded in page P2.html.

Because each page stored in the cache of the proxy server is assigned an expiration date, and the contents in the cache may be removed as part of page replacement, the pages P1.html and P2.html as well as their embedded objects may eventually be removed from the cache. However, when there is a new request for P1.html or P2.html, instead of fetching only P1.html or P2.html from the content provider server, in embodiments of the present invention the proxy server will examine its stored associations for P1.html or P2.html, and issue multiple pre-fetch requests in parallel to move embedded objects related to P1.html or P2.html into the cache. In the example of FIG. 10, if the proxy server receives a new request for P1.html, it will automatically pre-fetch obj1.jpg, obj2.jpg, obj4.jpg, and obj5.jpg into cache based on the stored associations for P1.html, if these objects are not already in cache. If the user's Web browser consequently issues additional embedded object fetches for obj1.jpg, obj2.jpg, obj4.jpg, or obj5.jpg, these objects can be sent to the user directly from the cache without the need for additional fetches from the content provider servers.

It is possible that the pre-fetched objects are actually not related to the requested page due to the fact that the page has been modified, or that the user has disabled loading of images so that the page request will never result in fetching of the related objects. Despite these possibilities, it is still more efficient for the proxy server to open parallel connections and pre-fetch objects from the content provider server in anticipation that they might be needed.

It should be noted that although embodiments of the present invention illustrated in FIG. 10 were described with respect to proxy servers, embodiments of the present invention apply to all requestors. In one alternative embodiment, a user that requests content directly from content provider servers may maintain a log in the memory of the user computer, store associations, and pre-fetch objects associated with an html page from the content provider servers according to the stored associations. In another alternative embodiment, a mirror server that copies content directly from a content provider server may maintain a log in the memory of the mirror server and store associations so that when content is to be refreshed, objects associated with an html page can be pre-fetched from the content provider server according to the stored associations.

Therefore, embodiments of the present invention provide a system and method for intelligent Web content fetching and delivery that keeps the connection between user and content provider server open for multiple object transfers, thereby reducing the number of steps needed to open and close connections. Embodiments of the present invention also improve the wait time for receiving full images by transmitting any remaining full or partial objects in ascending order of object size when multiple objects are being delivered.

Embodiments of the present invention also improve the response time of Web content fetches by pre-determining the addresses of domain names or pre-establishing connections in anticipation of their need, and by keeping a connection open in anticipation of future object transfers. Furthermore, in embodiments of the present invention the proxy server maintains a log of page and object fetches, determines and stores likely associations between page and object fetches occurring within a specified time window, and pre-fetches objects into cache according to the stored associations when subsequent page requests are received.

What is claimed is:

1. A Web content fetch and delivery system comprising:
   a proxy server configured for communicating with content provider servers over at least one communication network;
   said proxy server is programmed for responding to a request from a user for a Web page by retrieving the Web page from a corresponding one of the content provider servers and concurrently determining IP addresses of linked URLs in the Web page and for responding to a request from the user for contents of one of the linked URLs by retrieving the contents from a corresponding one of the content provider servers based on a corresponding one of the determined IP addresses;
   said proxy server performs the concurrent determination of the IP addresses of the linked URLs independent of one or more intermediate requests from the user and when no access request for the linked URLs have been received by the proxy server;
   said proxy server further automatically establishes connections to the linked URLs in the Web page prior to any request for those linked URLs; and
   said proxy server pre-fetches connecting communicating channels for said linked URLs to said content provider servers over said at least one communication network without pre-fetching content corresponding thereto for improving response time of said system.

2. A method for Web content fetch and delivery, comprising:
   a proxy server configured for communicating with content provider servers over at least one communication network;
   responding, by said proxy server, to a request from a user for a Web page by retrieving the Web page from a corresponding one of the content provider servers and concurrently determining IP addresses of linked URLs in the Web page;
   responding, by said proxy server, to a request from the user for contents of one of the linked URLs by retrieving the contents from a corresponding one of the content provider servers based on a corresponding on of the determined IP addresses;
   performing, by said proxy server, the concurrent determination of the IP addresses of the linked URLs independent of one or more intermediate requests from the user and when no access request for the linked URLs have been received by the proxy server;
   automatically establishing, by said proxy server, connections to the linked URLs in the Web page prior to any request for those linked URLs; and
   pre-fetching, by said proxy server, connecting communicating channels for said linked URLs to said content provider servers over said at least one communication network without pre-fetching content corresponding thereto for improving response time.

* * * * *

UNITED STATES PATENT AND TRADEMARK OFFICE
CERTIFICATE OF CORRECTION

PATENT NO. : 7,779,068 B2 Page 1 of 1
APPLICATION NO. : 11/053279
DATED : August 17, 2010
INVENTOR(S) : Wen-Syan Li, Kunihiro Taniguchi and Atsuhiro Tanaka

It is certified that error appears in the above-identified patent and that said Letters Patent is hereby corrected as shown below:

On the front cover of the patent include the provisional application data under Related U.S. Application Data:

Title page, item [62] should read as follows:
Provisional application No. 60/190,604, filed on March 20, 2000.

Signed and Sealed this

Twenty-third Day of November, 2010

David J. Kappos
*Director of the United States Patent and Trademark Office*